US008692160B2

(12) United States Patent
Brown

(10) Patent No.: US 8,692,160 B2
(45) Date of Patent: Apr. 8, 2014

(54) TEMPERATURE CONTROLLED DISPLAYS

(75) Inventor: Martin Brown, Yorkshire (GB)

(73) Assignee: Holmes Catering Group Limited, Yorkshire (GB)

(*) Notice: Subject to any disclaimer, the term of this patent is extended or adjusted under 35 U.S.C. 154(b) by 284 days.

(21) Appl. No.: 13/139,404

(22) PCT Filed: Dec. 18, 2009

(86) PCT No.: PCT/GB2009/051736
§ 371 (c)(1),
(2), (4) Date: Jul. 8, 2011

(87) PCT Pub. No.: WO2010/070353
PCT Pub. Date: Jun. 24, 2010

(65) Prior Publication Data

US 2012/0000898 A1 Jan. 5, 2012

(30) Foreign Application Priority Data

Dec. 20, 2008 (GB) .................................. 0823258.9

(51) Int. Cl.
*H05B 1/00* (2006.01)
*A21B 1/00* (2006.01)

(52) U.S. Cl.
USPC ........... 219/220; 219/411; 219/518; 219/520; 219/521

(58) Field of Classification Search
USPC .......................... 219/220, 411, 518, 520, 521
See application file for complete search history.

(56) References Cited

U.S. PATENT DOCUMENTS

| | | | | |
|---|---|---|---|---|
| 3,244,859 | A | | 4/1966 | Whiteford |
| 4,733,054 | A | | 3/1988 | Paul |
| 4,942,046 | A | * | 7/1990 | Scott ............................ 426/233 |

FOREIGN PATENT DOCUMENTS

| | | | |
|---|---|---|---|
| CH | 695329 | A5 | 4/2006 |
| CH | 695534 | A5 | 6/2006 |
| DE | 8705540 | U1 | 7/1987 |
| DE | 20203901 | U1 | 6/2002 |

OTHER PUBLICATIONS

International Preliminary Report on Patentability mailed Jun. 21, 2011 (PCT/GB2009/051736).
International Sesrch Report and Written Opinion mailed Jun. 14, 2010 (PCT/GB2009/051736); ISA/EP.

* cited by examiner

*Primary Examiner* — Shawntina Fuqua
(74) *Attorney, Agent, or Firm* — Banner & Witcoff, Ltd.

(57) ABSTRACT

A heated counter for service of hot food has one or more hotplates, a light source illuminating each hotplate and a number of light sensors below each hotplate. When a sensor is obscured by a dish of food, power is supplied to that hotplate, and when no sensor is obscured, that hotplate is kept in stand-by mode.

13 Claims, 7 Drawing Sheets

TEMPERATURE CONTROLLED DISPLAYS

CROSS-REFERENCE TO RELATED APPLICATIONS

This application is a U.S. National Stage application under 35 U.S.C. §371 of International Application No. PCT/GB2009/051736 (published as WO/2010/070353 A), filed Dec. 18, 2009, which claims priority to United Kingdom patent application No. 0823258.9, filed on Dec. 20, 2008. Benefit of the filing date of each of these prior applications is hereby claimed. Each of these prior applications is hereby incorporated by reference in its entirety.

BACKGROUND OF THE INVENTION

This invention relates to temperature controlled displays, especially to counters used for the service of hot or chilled food.

Counters for hot food are conventionally made of ceramic glass or the like, and are conventionally divided into several sections. Each section may have a separate manual power switch to permit only one or more selected section(s) to be powered up. On start-up, each section receives a power surge until it reaches the required temperature, and then draws power to maintain the surface at a temperature which is often 134 degrees C. This is wasteful if the sections are not in full use over a long period, ie if there are no food containers on the heated sections.

To reduce such waste of power, it is known to provide a beam of radiation close to and parallel to the counter top, as disclosed in DE 87 05 540 U1 Sholl. When food containers are present, the beam is interrupted and power supply is maintained; when there are no food containers on the counter, the beam reaches a sensor and power is disconnected from the heated counter.

In another area of technology, it is known that induction hobs used on domestic and industrial cookers will operate, ie draw power, only when a ferrous container such as a pan is in position on the hob. However, ferrous pans are expensive and are not often used for self-service food containers.

SUMMARY OF THE INVENTION

It is an object of the invention to provide a temperature-controlled display counter which is less wasteful of power than known arrangements.

According to the invention a temperature-controlled display counter comprises at least one temperature-controllable area on a display surface; a power supply means for each temperature-controllable area to supply heating or cooling; above the display surface a radiation source incident over substantially the whole display surface; and below each temperature-controllable area at least one radiation sensor; arranged so that when no radiation sensor below a temperature-controllable area is obscured, the power supply to that area is maintained at stand-by level, and when a radiation sensor is obscured, the power supply to that area is increased.

Optionally the temperature-controllable areas are hotplates, and optionally the radiation source is a source of both heat and light.

Preferably the radiation source is provided as separate sections arranged so that each section irradiates one hotplate, and further arranged so that when the power supply to a hotplate is reduced to stand-by level, the power supply to the respective section of radiation source is also reduced.

Preferably each hotplate comprises an upper layer transparent to light and below the upper layer a heating pad having an aperture in correspondence with each radiation sensor.

BRIEF DESCRIPTION OF THE DRAWINGS

An embodiment of the invention will now be described by way of example only with reference to the accompanying drawings in which.

DETAILED DESCRIPTION OF EMBODIMENTS OF THE INVENTION

Figure 1:
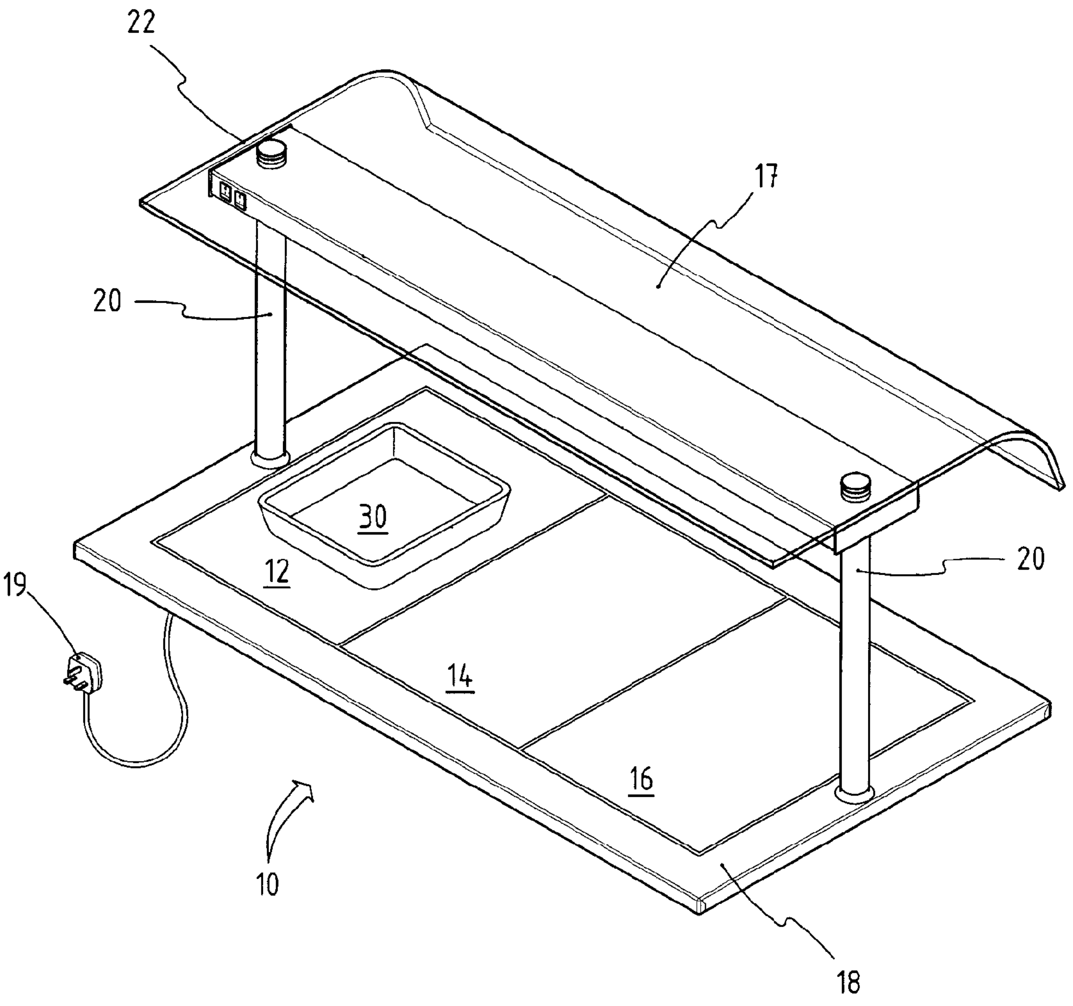
FIG. 1 is a view of a heatable display counter having three sections.

In FIG. 1, a heatable display counter 10 for use as a hot food servery comprises three separate ceramic hotplates 12, 14, 16 of black glass surrounded by a trim 18. Above the hotplates 12, 14, 16 and carried on end supports 20 is an array of quartz halogen heater lamps 22 arranged so that the entire area of the hotplates is irradiated with heat and light. There is a power supply 19 and a sneeze screen 17.

Figure 2:
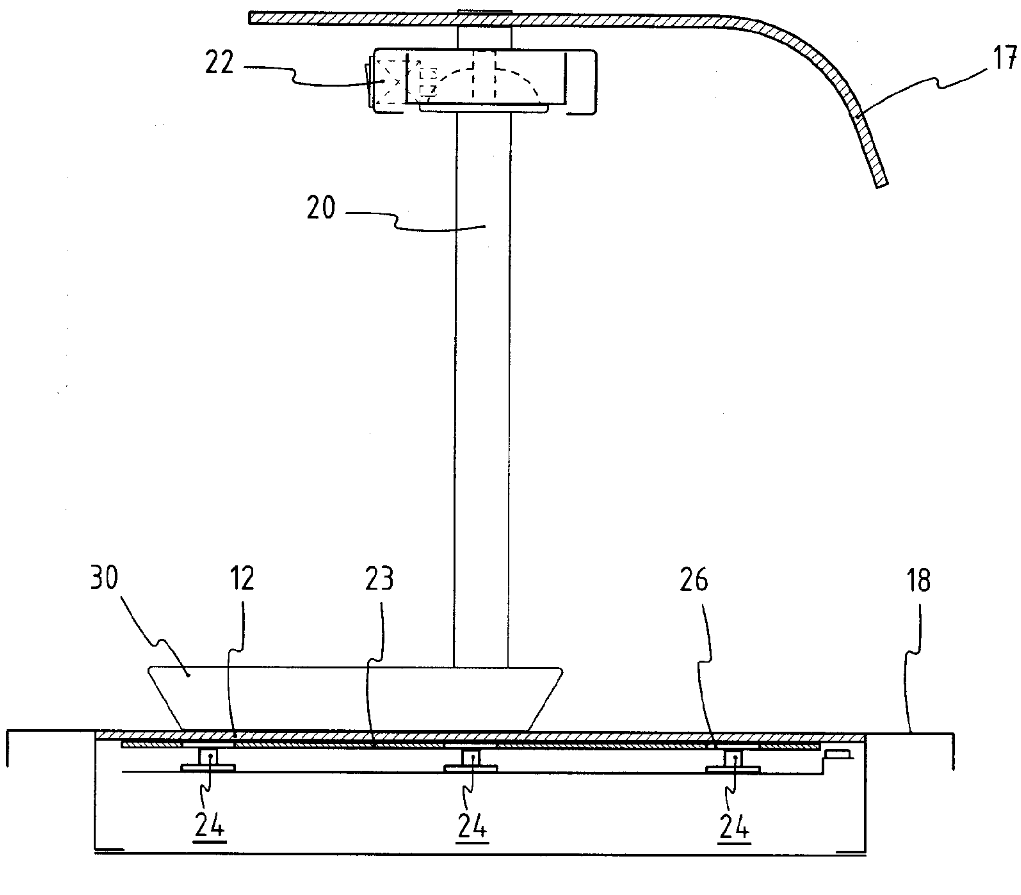
FIG. 2 is a vertical section through the counter of FIG. 1.

In FIG. 2, a section through hotplate 12 is shown; below and in contact with the hotplate 12 is a heater mat 23, and below the mat are a number of light sensors 24. The mat 23 has an aperture 26 above each light sensor 24.

Figure 3:
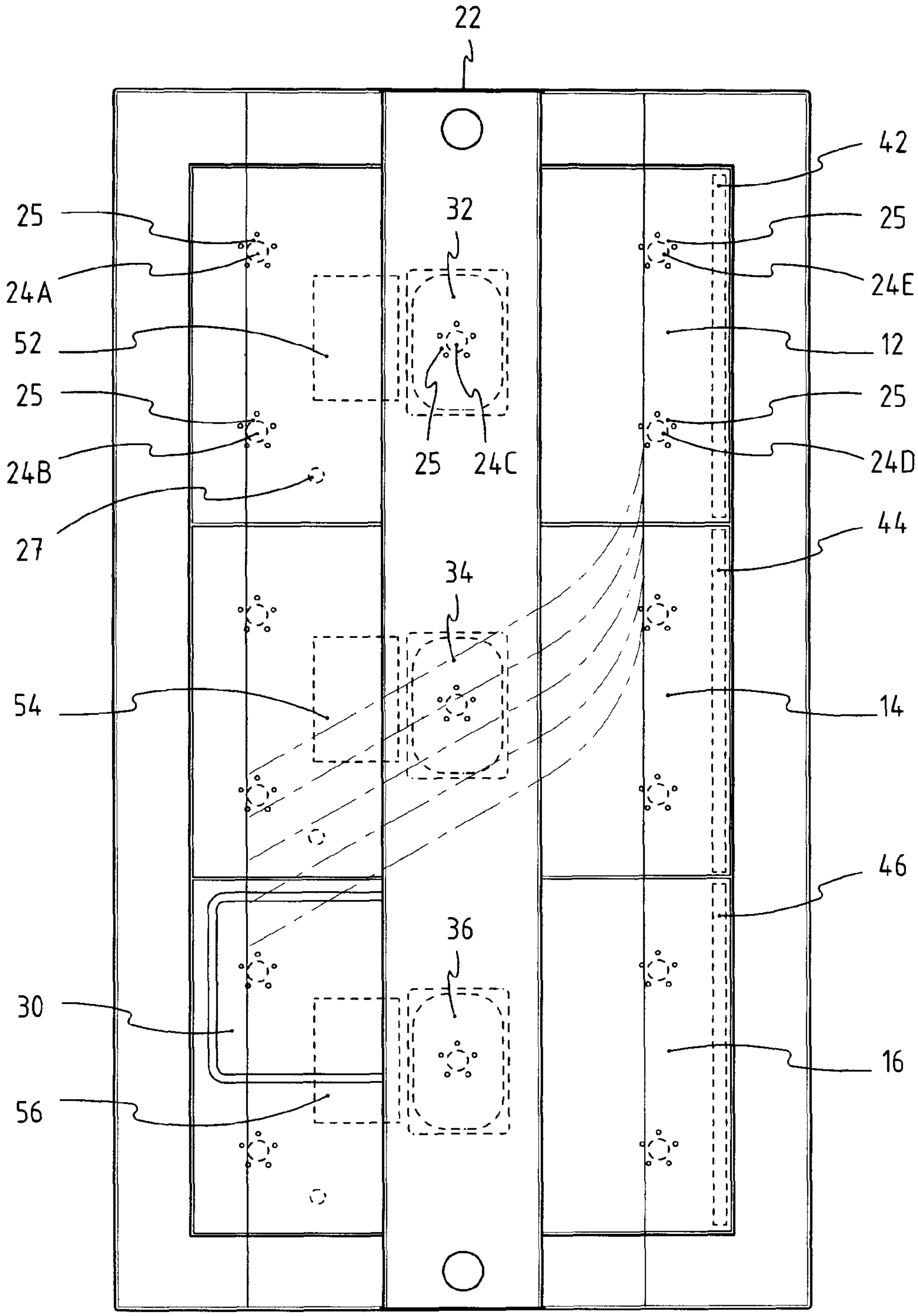
FIG. 3 is plan view of the counter.

Referring now to FIG. 3, the hotplate 12 is provided with five light sensors 24 A,B,C,D,E spaced over the area of the hotplate. Above the hotplate 12 is one quartz halogen lamp 32 in the array 22, which illuminates all five light sensors 24 A,B,C,D,E. The hotplates 14 and 16 have similar arrays of light sensors and respective lamps 34 and 36. Each hotplate has a temperature probe 27, and above each hotplate is a processor-based control unit 52, 54, 56.

On start-up of the display counter 10, the control units 52, 54, 56 are arranged to supply power so that each hotplate 12, 14, 16 increases slowly in temperature to a pre-set level, sensed by the temperature probes 27, and set to be appropriate for stand-by mode; this avoids the need for a power surge as has previously been the case, thus giving an immediate energy saving. When a hot dish of food 30 is placed on hotplate 12 (see FIGS. 1 and 2), the light from lamp 32 falling on one or more light sensors 24 is obscured and the control unit 52 causes increased power to be supplied to hotplate 32, and the corresponding quartz heater lamp 32 is also switched on. The other hotplates 14, 16 remain in stand-by mode. This allows the temperature of the food in the dish 30 to be maintained in energy efficient mode. When the dish 30 is removed, the previously obscured sensors 24 are again illuminated and the hotplate 12 is once more put into stand-by mode (reduced power) by the control unit 52, but after a short delay (for example one minute) in case an immediate replacement dish is put on the hotplate.

It has been found that the hotplate when powered-up can be maintained at a temperature lower than has previously been the case, giving an additional saving of energy.

Referring again to FIG. 3, the counter 10 has a strip of LED lights along the serving side of the counter (on the right in the illustration), the strip being in sections 42, 44, 46 corresponding to the hotplates 12, 14, 16. When the power in an adjacent hotplate is in stand-by mode, the LEDs in that section of strip are illuminated at a low level; when the adjacent hotplate is powered-up, the LEDs are illuminated at a high level.

Around the position of each light sensor 24 on each hotplate is a ring of LEDs 25; these LEDs are powered up when the counter is switched on to indicate the positions of the light sensors so that hot dishes placed on the counter are positioned to obscure at least one of the sensors 24. The LEDs 25 can also be arranged to flash if any electrical fault occurs in the counter.

Figure 4:
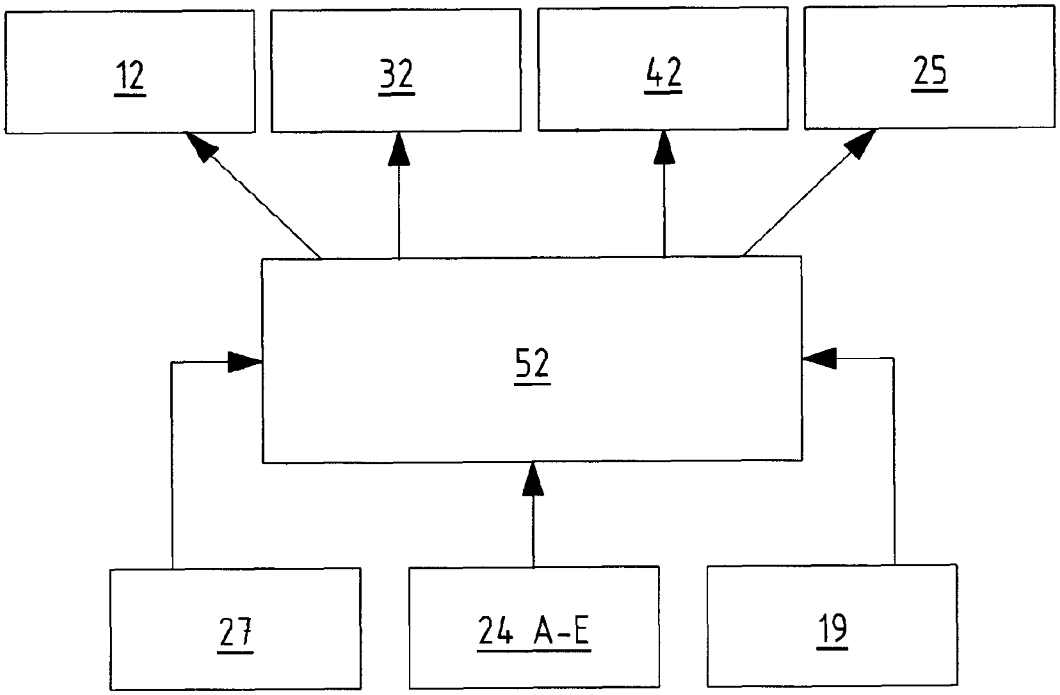
FIG. 4 indicates in schematic form the sensing and power supply arrangements.

FIG. 4 indicates the operation of each processor-based control unit: the unit 52 controlling hotplate 12 is shown. The unit 52 receives inputs from the light sensors 24 A, B, C, D and E, and from the temperature probe 27, and switches a high level of power to the hotplate 12, the halogen heater lamp 32, and the LED strip 42, when any light sensor 24 is obscured, and a stand-by level of power when no light sensor 24 is obscured. If the halogen lamp 32 fails, the control unit 52 switches the hotplate 12 to full power until the lamp is replaced, although naturally energy efficiency is temporarily lost. Power is also supplied to the LED rings 25, which are caused to flash if a fault is detected.

Reference has been made to the use of black glass for the hotplates 12, 14 and 16; such glass is sufficiently transparent for the light sensors 24 to operate.

Figure 5:
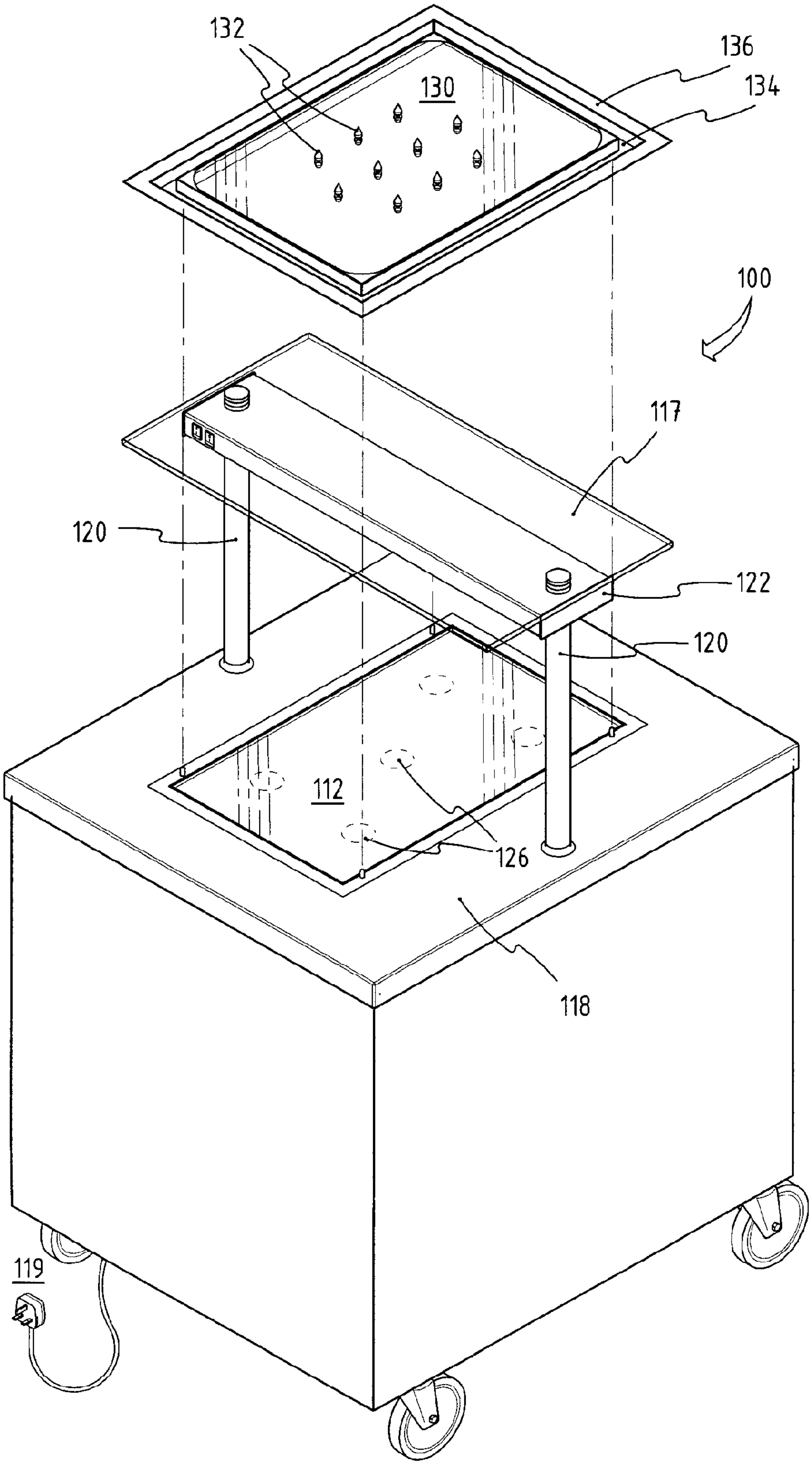
FIG. 5 is a view of a single section counter usable as a carvery.

FIG. 5 shows a heatable display counter 100 having a single hotplate 112 surrounded by a trim 118, having end supports 120 carrying a quartz halogen heater lamp 122, and a sneeze screen 117. There is a power supply 119 and a control unit (not shown). The positions of five apertures above the light sensors positioned below the hotplate 112 are indicated at 126. The hotplate 112 operates in the same way as hotplate 12 described with reference to FIGS. 1 to 4.

This embodiment can also be used as a carvery. Shown in exploded form is a carvery plate 130 having a number of carvery spikes 132. The plate 130 is surrounded by a juice catcher channel 134 in a plate collar 136. When the carvery plate 130 is placed over the hotplate 112, the hotplate is powered-up and any hot joint on the carvery plate is kept at an appropriate temperature in an energy-efficient way.

Figure 6:
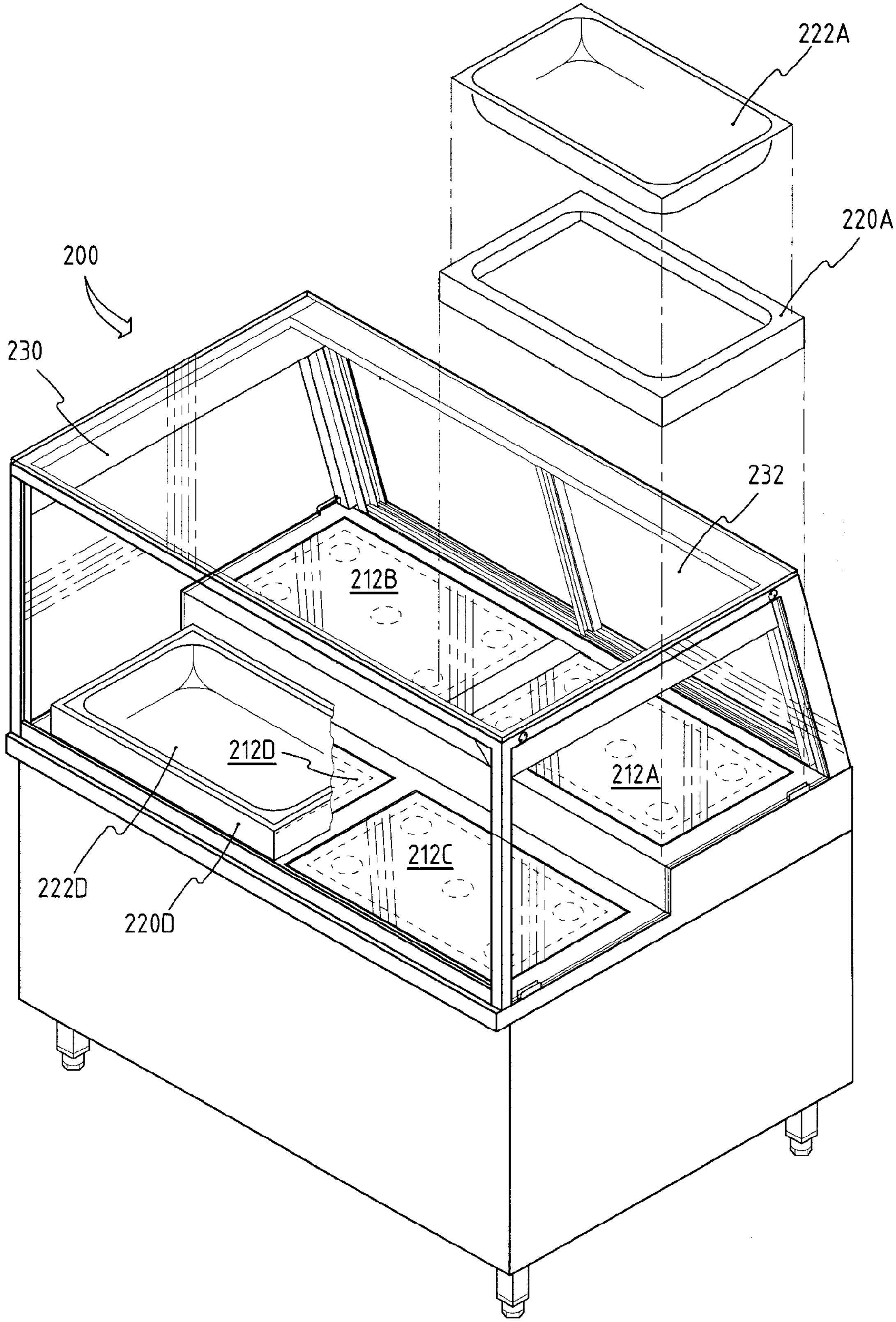
FIG. 6 is a view of a four-section counter usable to serve hot chicken.

FIG. 6 is a four-section embodiment usable as a hot chicken counter 210; there are two hotplates 212A and 212B on the serving side (to the rear in the Figure) and two hotplates 212C and 212D towards the front or customer side. On each hotplate the positions of the apertures 226 above the light sensors are indicated; each hotplate operates in the same way as described with reference to FIGS. 1 to 4. The counter is enclosed in a glass cabinet 230 which has sliding doors 232 at the serving, rear, side.

The two rear hotplates 212 A and B are at a higher level than the forward hotplates 212C and D so that a customer has a good view of displayed food. Shown in exploded form above hotplate 212B is a rectangular metal collar 220B which has the same dimensions as the hotplate, and has a central aperture into which a shallow metal serving dish 222B can be placed. An assembled collar 220C and dish 222C are shown on hotplate 212C. When only the collar is over the hotplate, the light sensors are not obscured and power supply is at stand-by level, but when a dish 222 is placed in the collar, the sensors associated with that hotplate are obscured and the hotplate is powered up. The serving dish 222 can be used to serve hot chicken.

Figure 7:
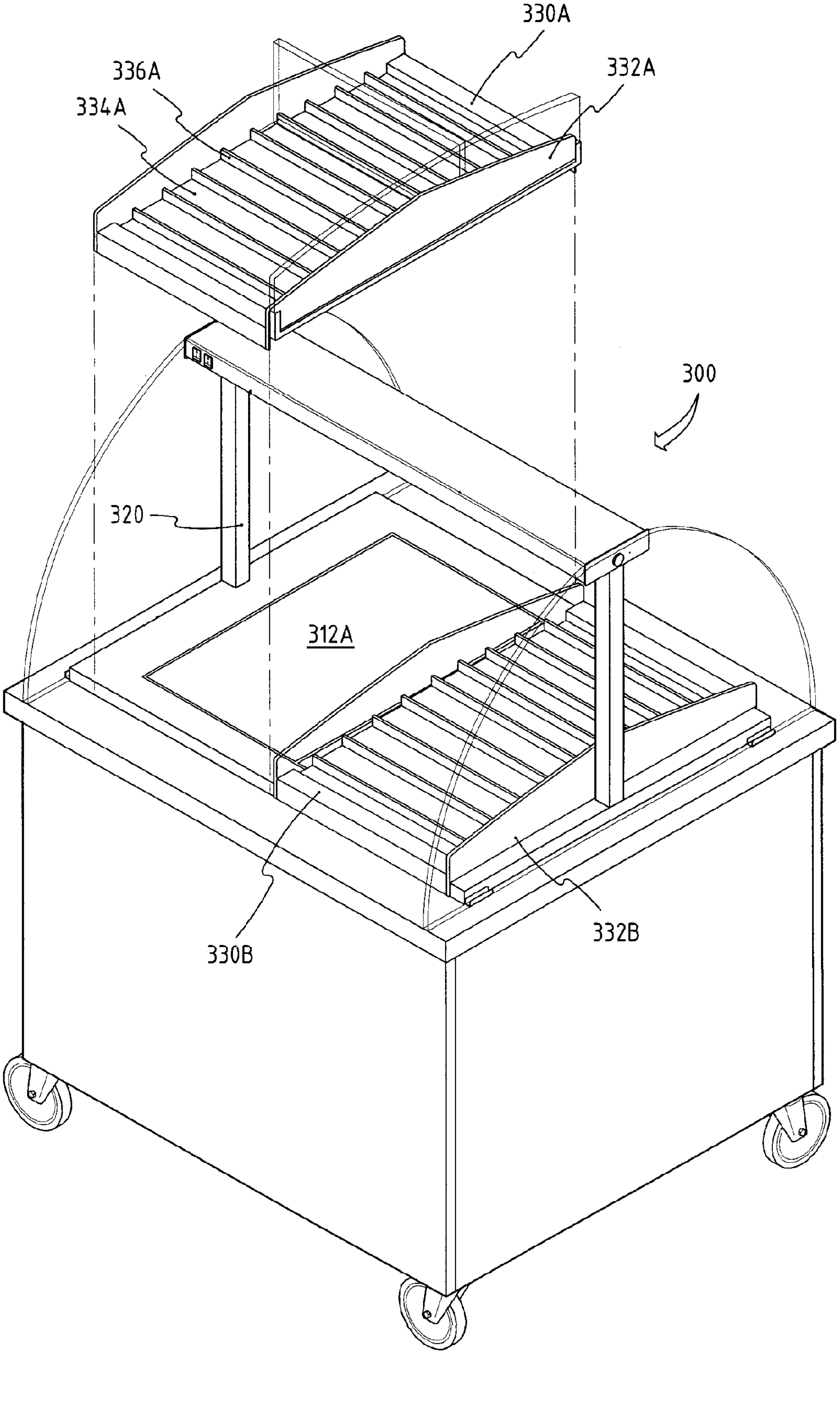
FIG. 7 is a view of a two-section counter usable to serve hot pies.

FIG. 7 is a two-section embodiment which can be used to serve hot pies or the like. The two hotplates, of which the lefthand hotplate 312A is visible, operate in the same way as described with reference to FIGS. 1 to 4. Shown in exploded form above hotplate 312A is a pastry tray 330A which comprises a rectangular metal collar 332A of the same dimensions as the hotplate 312A. On the collar sits a divided metal tray 334A, the divisions being low walls 336A spaced so as to accommodate pies or pasties or other hot pastries.

When a pastry tray, such as tray 330B, is in position on a hotplate, the pastries can be kept at a required temperature in an energy-efficient manner.

The invention has been described with reference to a heatable display counter but it is also applicable to chilled display counters; such a counter would be supplied with fluorescent or LED lamps instead of heater lamps.

The invention claimed is:

1. A heatable display counter comprises at least one heatable area; a power supply means connectable to each heatable area; a radiation source incident over substantially the whole of each heatable area; and below each heatable area at least one radiation sensor; arranged so that when no radiation sensor below a heatable area is obscured, the power supply means to that area is maintained at stand-by level, and when at least one radiation sensor is obscured, the power supply means to that heatable area is increased.

2. A heatable display counter according to claim 1 in which each heatable area is a hotplate.

3. A heatable display counter according to claim 1 in which the radiation source is a source of both heat and light.

4. A heatable display counter according to claim 2 having a plurality of hotplates in which the radiation source is provided as separate sections arranged so that each section irradiates one hotplate, and further arranged so that when the power supply means to a hotplate is reduced, the power supply means to the respective section of radiation source is also reduced.

5. A heatable display counter according to claim 2 in which each hotplate comprises an upper layer transparent to light and below the upper layer a heating pad having an aperture in correspondence with the or each radiation sensor.

6. A heatable display counter according to claim 5 further comprising illuminable means on the hotplate to indicate the position of the at least one radiation sensor.

7. A heatable display counter according to claim 5 further comprising illuminable means adjacent the hotplate to indicate whether that hotplate is in stand-by or a powered up mode.

8. A heatable display counter according to claim 2 in which each hotplate comprises an upper layer transparent to light and below the upper layer a heating pad having an aperture in correspondence with the or each radiation sensor.

9. A heatable display counter according to claim 4 in which each hotplate comprises an upper layer transparent to light and below the upper layer a heating pad having an aperture in correspondence with the or each radiation sensor.

10. A heatable display counter according to claim 8 further comprising illuminable means on the hotplate to indicate the position of the at least one radiation sensor.

11. A heatable display counter according to claim 8 further comprising illuminable means adjacent the hotplate to indicate whether that hotplate is in stand-by or a powered up mode.

12. A heatable display counter according to claim 9 further comprising illuminable means on the hotplate to indicate the position of the at least one radiation sensor.

13. A heatable display counter according to claim 9 further comprising illuminable means adjacent the hotplate to indicate whether that hotplate is in stand-by or powered up mode.

* * * * *

UNITED STATES PATENT AND TRADEMARK OFFICE

CERTIFICATE OF CORRECTION

PATENT NO. : 8,692,160 B2
APPLICATION NO. : 13/139404
DATED : April 8, 2014
INVENTOR(S) : Martin Brown It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this
Twenty-ninth Day of September, 2015

Michelle K. Lee
*Director of the United States Patent and Trademark Office*